United States Patent
Hehl

(10) Patent No.: US 6,719,553 B1
(45) Date of Patent: Apr. 13, 2004

(54) MOLD-CLOSING UNIT FOR AN INJECTION MOLDING MACHINE

(76) Inventor: Karl Hehl, Arthur-Hehl-Strasse 32, D-72290 Lossburg (DE)

( * ) Notice: Subject to any disclaimer, the term of this patent is extended or adjusted under 35 U.S.C. 154(b) by 307 days.

(21) Appl. No.: 09/668,615

(22) Filed: Sep. 22, 2000

Related U.S. Application Data

(63) Continuation-in-part of application No. PCT/EP99/01869, filed on Mar. 20, 1999.

(30) Foreign Application Priority Data

Mar. 24, 1998 (DE) .......................................... 198 12 741
Sep. 22, 1999 (EP) ............................................... 99118685

(51) Int. Cl.[7] .............................................. B29C 45/64
(52) U.S. Cl. ........................ 425/190; 425/589; 425/595
(58) Field of Search ................................ 425/190, 589, 425/595, 450.1, 451.9

(56) References Cited

U.S. PATENT DOCUMENTS

| | | | | |
|---|---|---|---|---|
| 3,590,437 A | * | 7/1971 | Annis et al. ................. | 425/149 |
| 3,669,599 A | * | 6/1972 | Snider et al. ............ | 425/451.9 |
| 3,890,081 A | * | 6/1975 | Grundmann ............. | 425/450.1 |
| 4,281,977 A | * | 8/1981 | Farrell ........................ | 425/149 |
| 4,340,346 A | * | 7/1982 | Hehl ........................ | 425/152 |
| 4,373,890 A | * | 2/1983 | Hehl ........................ | 425/153 |
| 5,059,365 A | * | 10/1991 | Hertzer et al. .............. | 425/150 |
| 5,511,963 A | * | 4/1996 | Hehl ........................... | 425/190 |

FOREIGN PATENT DOCUMENTS

| | | |
|---|---|---|
| DE | 24 29 570 | 1/1975 |
| DE | 3042712 | 6/1982 |
| DE | 42 43 735 | 7/1993 |
| JP | 4-169216 | 6/1992 |
| JP | 5-329900 | 12/1993 |
| WO | 99/48667 | 9/1999 |

OTHER PUBLICATIONS

Huskey Injection Molding Systems, Brochure (undated).
"Elektra S–Serie", of the company Ferromatic Milacron Maschinenbau GmbH, 79364 Malterdingen, p. 5 (undated).
Engel Vertiebsgesellschaft M.B.H., advertisement (undated).

* cited by examiner

Primary Examiner—James P. Mackey
(74) Attorney, Agent, or Firm—Cantor Colburn LLP

(57) ABSTRACT

In a mold-closing unit a device for variably fixing the spacing between the stationary mold carrier and moveable mold carrier is provided, which device comes into operational connection with a guide element to fix a set spacing. Associated with the moveable mold carrier is a fixing device which, on actuation, fixes the moveable mold carrier in its respective position. The drive for moving the moveable mold carrier itself alters the spacing along a portion of the guide element when the fixing device is actuated and the clamping device is not operationally connected. Drive has at least two parts which are operationally connected with one another, of which one part is supported on a support element and the other part is connected to the moveable mold carrier. One of the two parts of the drive also extends in linear fashion in the closing direction during the closing movement as a linear movement means for the moveable mold carrier.

20 Claims, 9 Drawing Sheets

MOLD-CLOSING UNIT FOR AN INJECTION MOLDING MACHINE

REFERENCE TO RELATED APPLICATIONS

Figure 1:
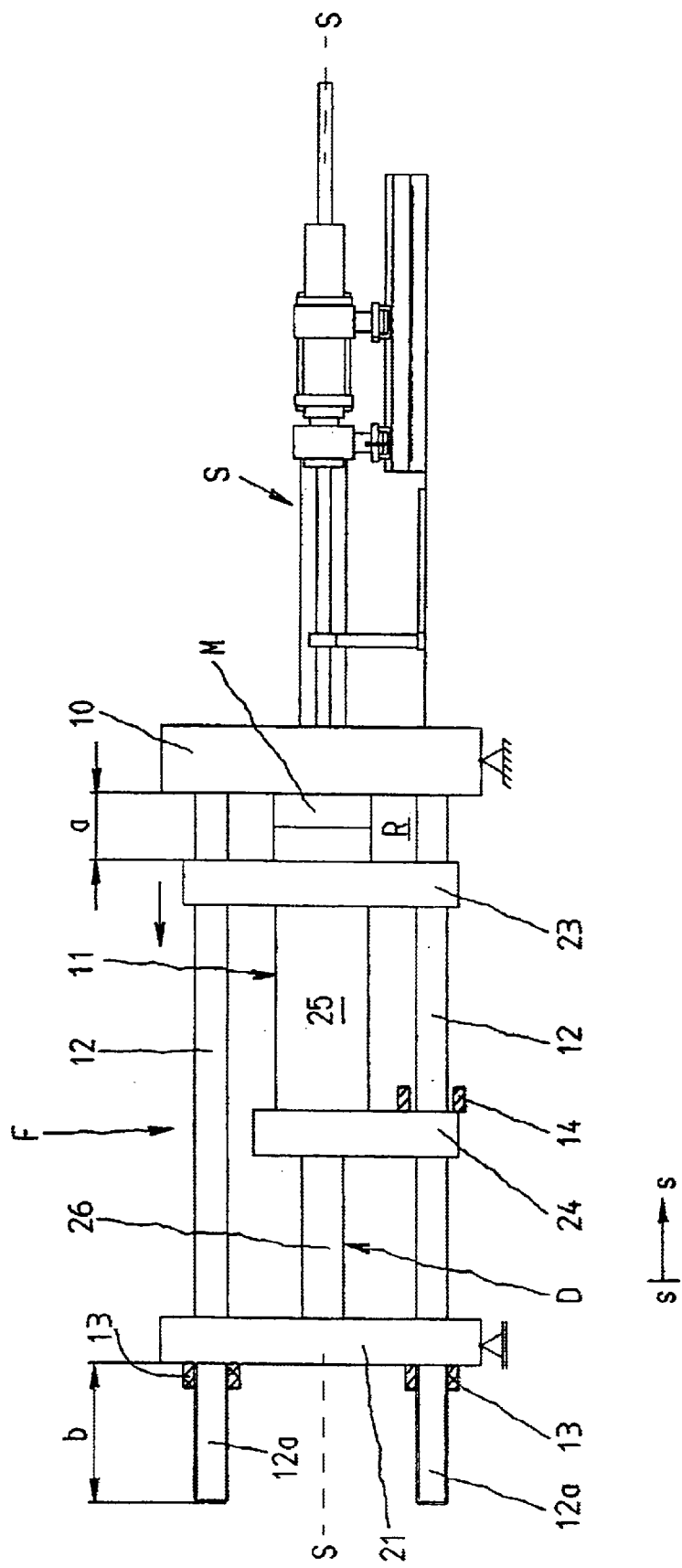

The present application is a continuation-in part application based on the PCT application PCT/EP 99/01869, filed on Mar. 20, 1999 in the name of the applicant, in which inter alia the U.S.A. is designated and which claims the priority of the German patent application 198 12 741.3, filed on Mar. 24, 1998, the disclosure of which is hereby expressly also made the subject matter of the present application.

FIELD OF THE INVENTION

The invention relates to a mold-closing unit for an injection molding machine to process plastics materials and other plasticizable masses such as powdery or ceramic masses in accordance with the preamble of claim 1, this mold-closing unit having a mold height adjustment device.

By "mold height" is here understood the height of the mold which is measured in the closing direction and which corresponds to the distance between the moveable mold carrier and the stationary mold carrier when the mold is closed. Adjusting devices of this kind are first of all necessary in injection molding machines in which the closing movement and the building-up of the locking pressure takes place via a toggle joint, since the support plate for the toggle joint has to be positioned in relation to the integrated injection molding tool in such a way that as the too or the mold is closed, the toggle joint is expanded and thus can apply is maximum locking pressure in each cycle.

PRIOR ART

From PATENT ABSTRACTS OF JAPAN, vol. 16, No. 471 (M-1318), 1992-09-30) and JP 04 169216 A is known a mold-closing unit, underlying the preamble of claim 1 and having a mold height adjustment. This mold height adjustment is used as usual in connection with a toggle joint as the closing mechanism. On the moveable mold carrier, an electromagnetically actuatable fixing device is provided and on the support element for the toggle joint mechanism a fixing device is provided which may be actuated manually to detachably fix the support element. If when the moveable mold carrier is fixed and the support element detached, the closing motor driving the toggle joint is actuated, the support element is displaced into the necessary position for the new mold height, in which the locking pressure can be applied with the toggle joint in an expanded position. The support element is not fixed in a positive manner, and thus after a plurality of cycles at least the precision suffers in the repeated application of the locking pressure. Above all however this mold height adjustment has no influence on the opening path to open the mold, since this is dependent on the movement of the toggle joint and not on the position of the support element.

Mold-closing units with mold height adjustments are known in which there are provided on bars, which are mostly fixed to the stationary mold carrier and serve to guide the moveable mold carrier, threaded portions which are connected with nuts. These nuts are driven via a separate drive to adjust the mold height. The nuts have on their outer side a ring gear, such that they can be actuated either with a ring gear or with a toothed belt. (U.S. Pat. No. 4,281,977; Brochure "Elektra S-Serie" (p.5) of the company Ferromatic Milacron Maschinenbau GmbH, 79364 Malterdingen).

For adjusting the mold height and locking a support plate for the closing mechanism, the company Engel Vertriebs GmbH, A-4311 Schwertberg, Austria has a known way of providing the bars with grooves and fixing to these grooves two half nuts by moving the half-nuts in a radial direction towards one another until they come into contact with the grooved region of the guide bars.

Furthermore, from the company Husky Injection Molding Systems there is a known way of achieving locking of this kind with a bayonet fastening. For this purpose, the bar has regions into which a closing piston can engage, as well as regions along which the moveable dosing piston can slide radially on the guide bars. By turning the closing piston, a positive-locking effect is caused, such that at least a portion of the locking pressure can also be applied to this piston simultaneously. This use is not however for adjusting the mold height but, as in DE 42 43 735 C, to fix the moveable mold carrier in a two-plate system, without any influence being exerted on the closing drive.

From DE 24 29 570 B1 is known an injection molding machine in which two pressure cylinders are used to close the mold. One pressure cylinder serves to displace the moveable mold plate, a further cylinder to apply the locking pressure. Correspondingly, even during the injection molding cycles, two plates are moved jointly as the moveable mold carrier. A support element which is adjustable with an alteration of the mold height is not provided. The fixing device is only actuated when the piston of the cylinder has completed its stroke movement and in addition now the locking pressure is to be applied via the piston.

From DE 49 43 735 C2 is known a two-plate machine in which, in order to achieve the mold closure, the moveable mold plate is drawn towards the stationary mold carrier. The moveable mold carrier is separable from the guide bars which are necessary during the application of the locking pressure and can be locked to same. However once the locking has been accomplished, it is only the closing cylinder which is responsible for the mold closing movement and the application of the locking force. Alteration and thus optimization of the locking pressure is thus not possible.

In parallel proceedings, the document DE 30 42 712 was cited, the object of which is completely different however, since there, on engagement grooves of the guide bars, a locking mechanism for the protective bolt is triggered and locked, which covers the mold tentering space.

SUMMARY OF THE INVENTION

Proceeding from this prior art, the object underlying the present invention is to create a mold-closing unit of the type mentioned initially in which the height adjustment can be used simultaneously to optimize the opening stroke.

This object is achieved by a mold-closing unit with the features of claim 1.

Associated with the moveable mold carrier is a fixing device, such that the moveable mold carrier can be fixed in any way in its current position. If the locking of the drive is detached from the bars, the drive can be adjusted with its respective support relative to the bars, such that a mold height adjustment occurs. Since the drive device usually used for a main axis can now be used for a subordinate function, an additional drive for the adjustment of the mold height can be dispensed with. Additional guide elements are not necessary since the guide elements which are present anyway, generally the tie bars, can be used. In contrast to the previously-known mold height adjustments on toggle joint closing mechanisms, independently of the mold height on closing mechanisms with linear movement means, the opening stroke or the closing path can be simultaneously optimized, when injection molds of differing heights are used on one and the same machine. Since, as a result of their purely linear movement, these units are adjustable in any way in respect of the opening stroke, providing such mold-closing units with a height adjustment system was previously refrained from. Through the use of the mold height adjustment device, however, in each cycle the pressure build-up times can be reduced in the order of several tenths of seconds. There is thus an optimization of the position of the whole closing unit.

SHORT DESCRIPTION OF THE FIGURES

Figure 2:
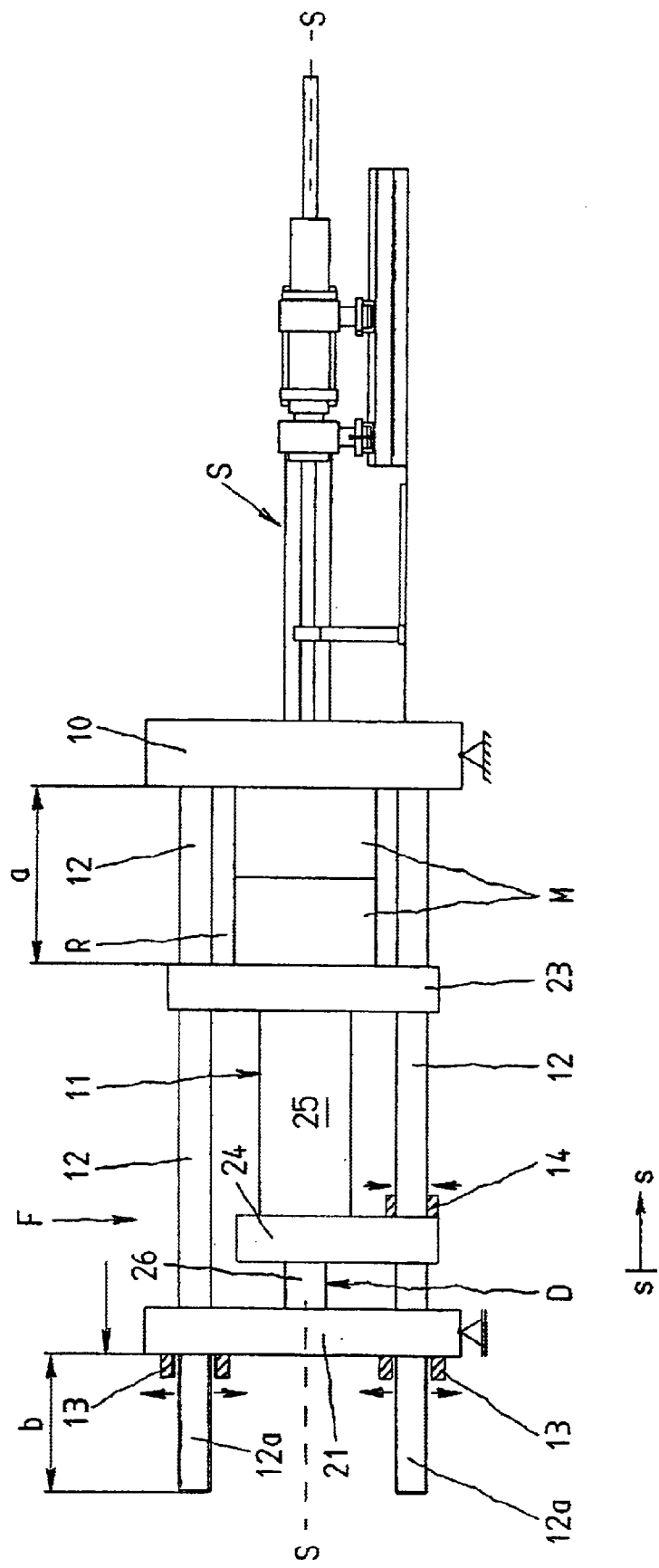
Figure 3:
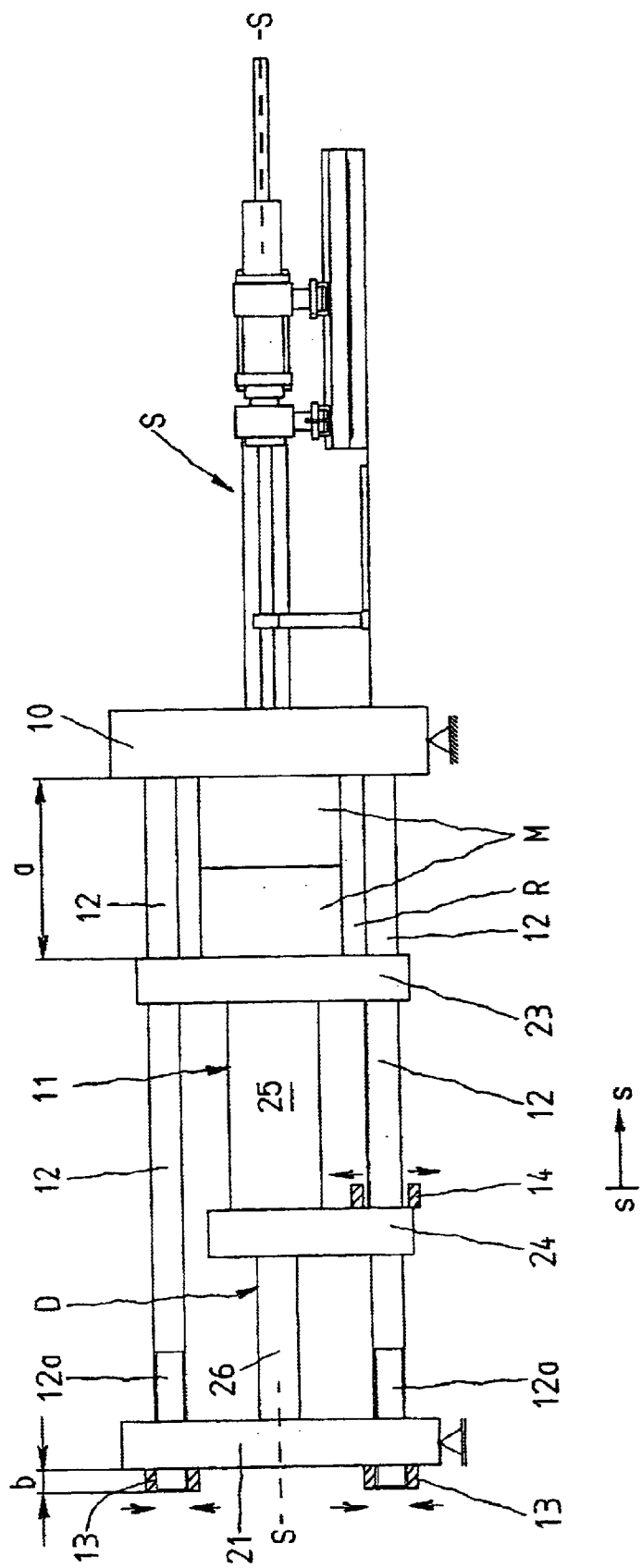
Figure 4:
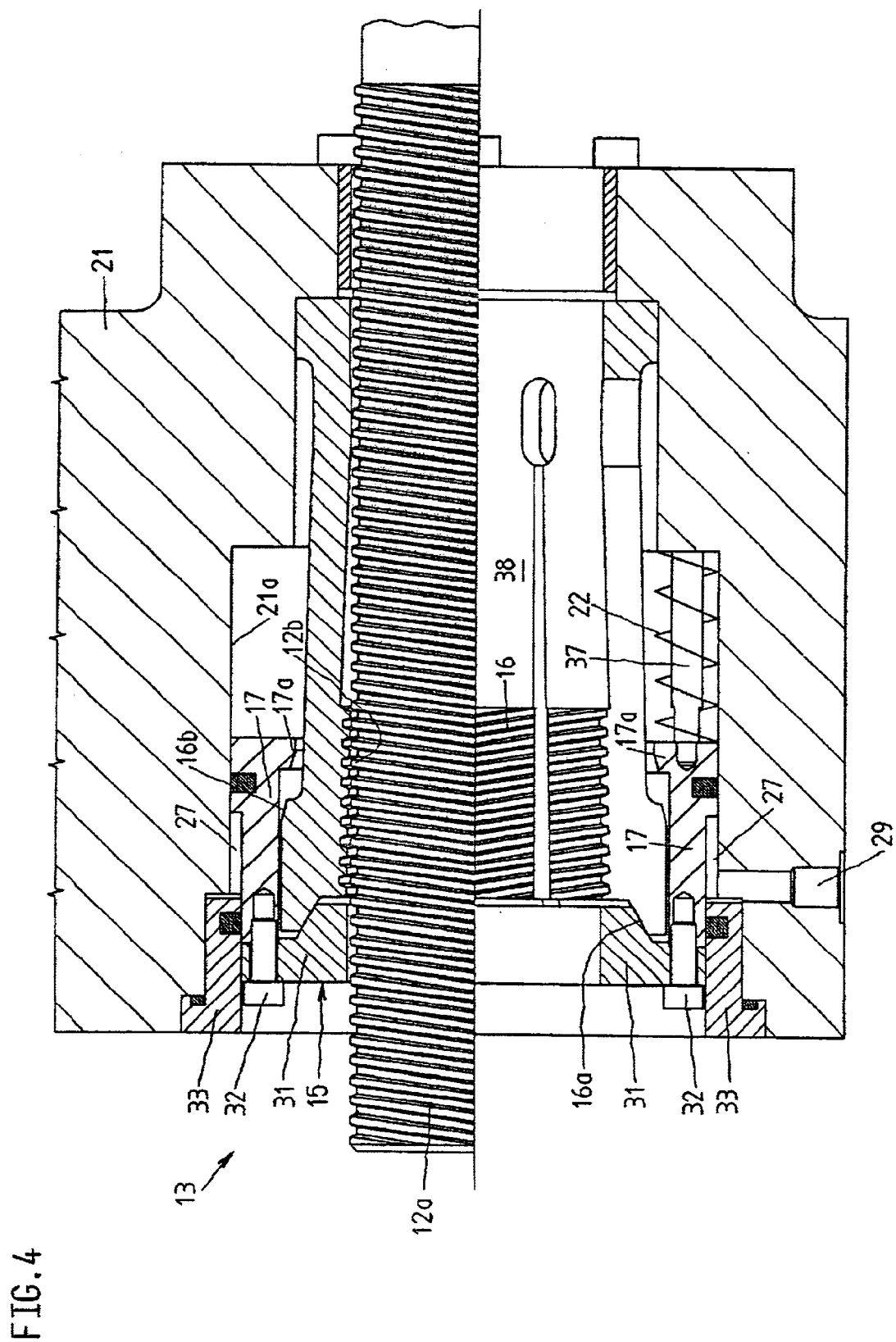
Figure 5:
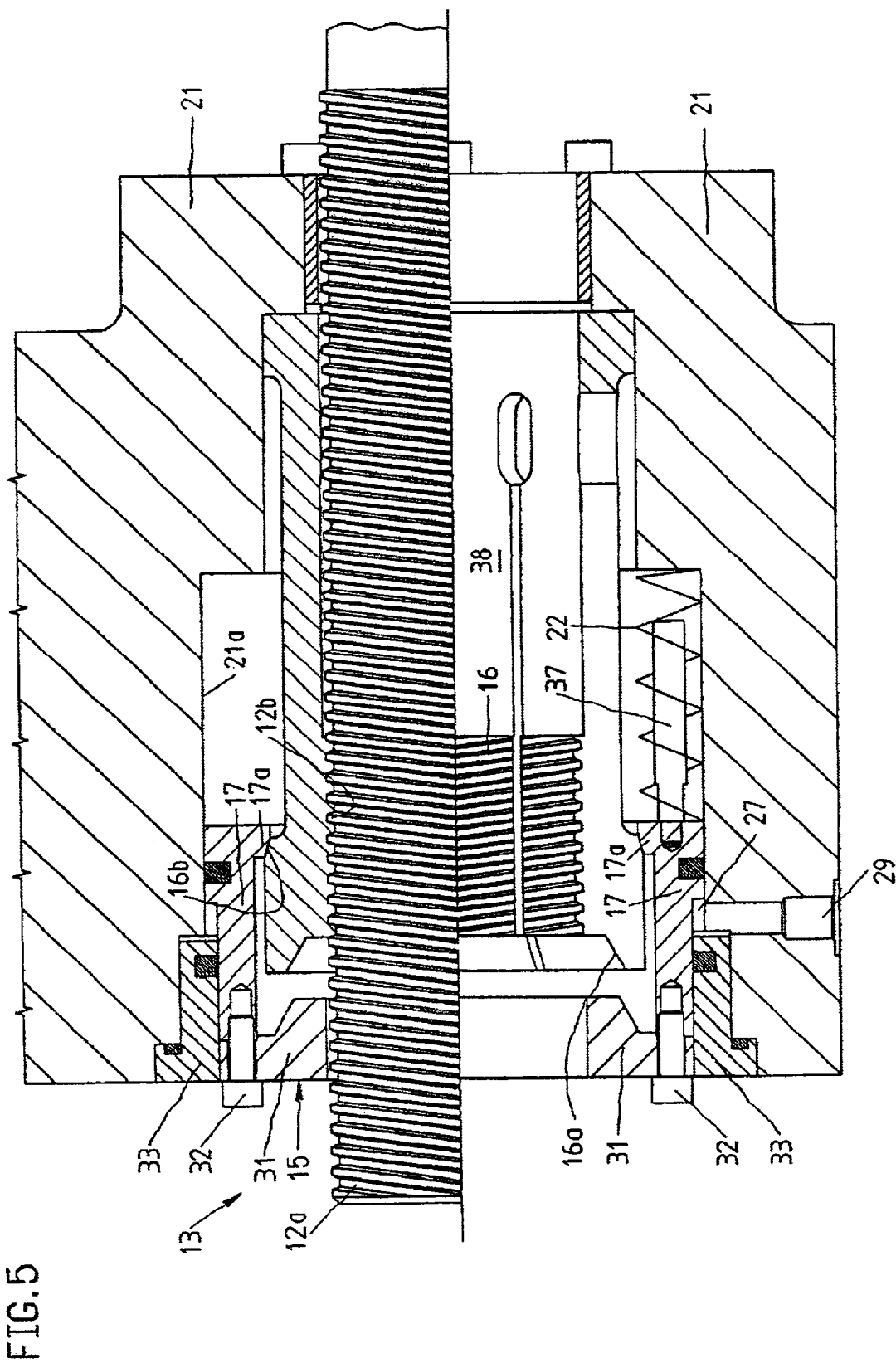
Figure 6:
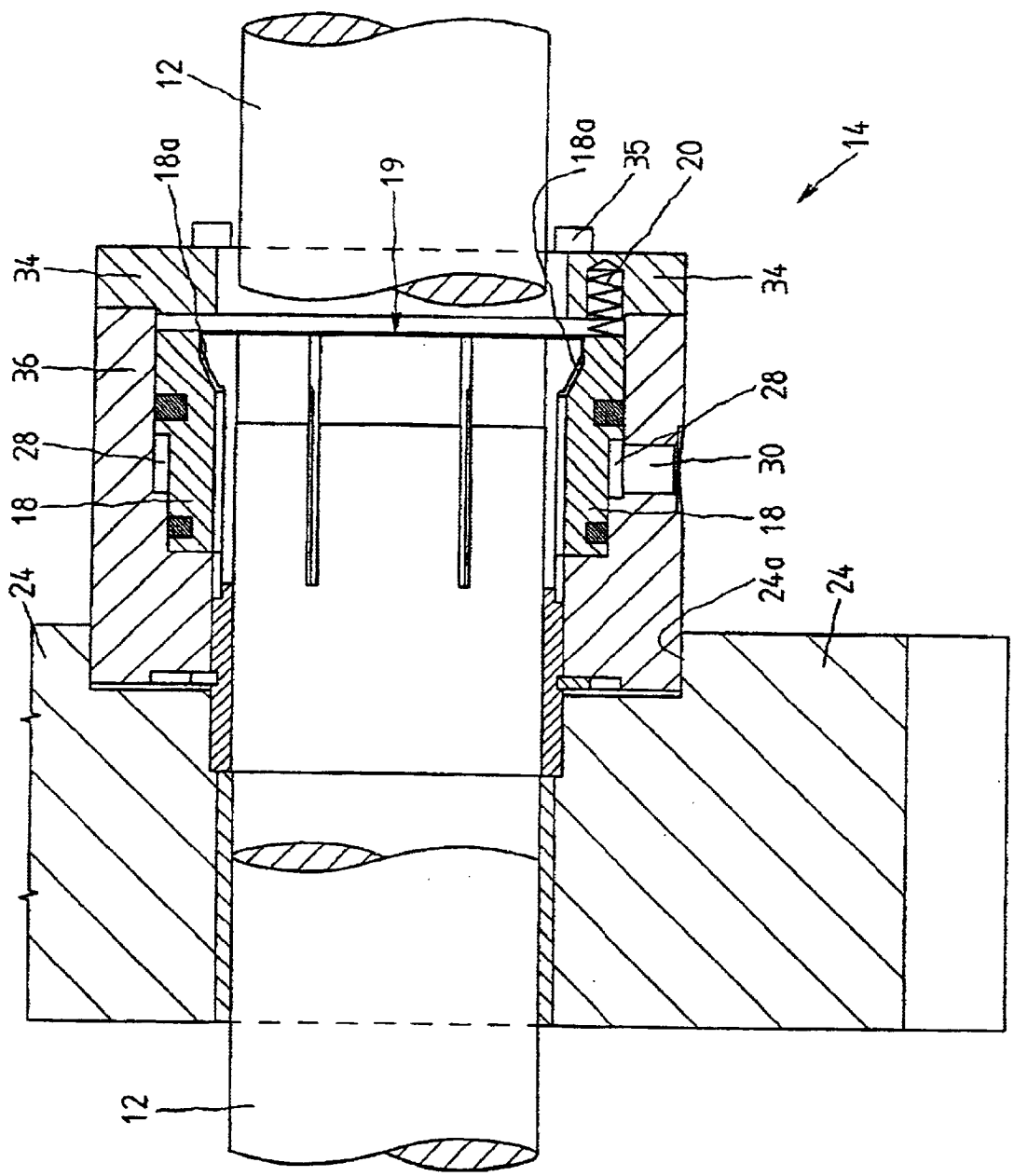
Figure 7:
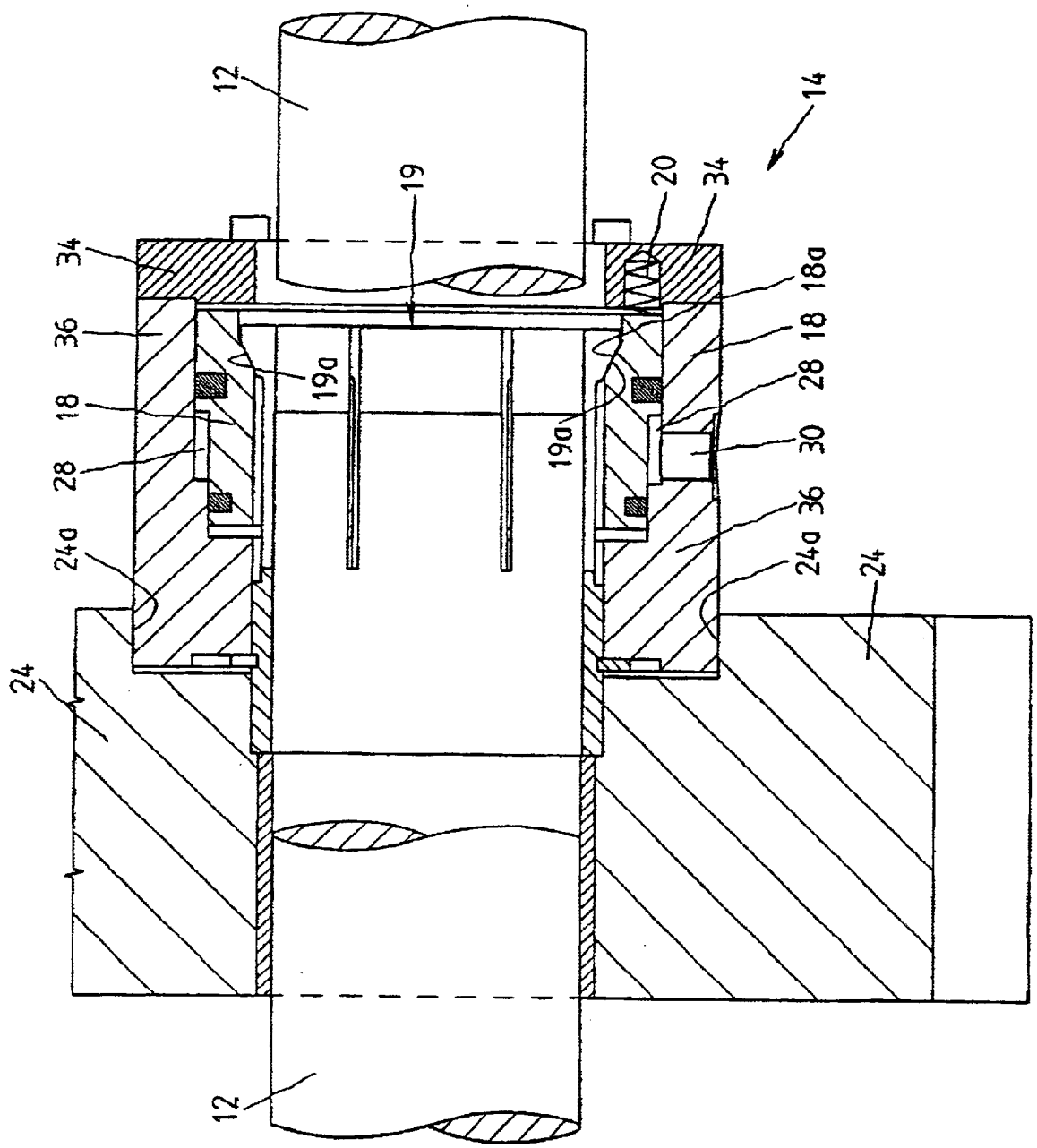
Figure 8:
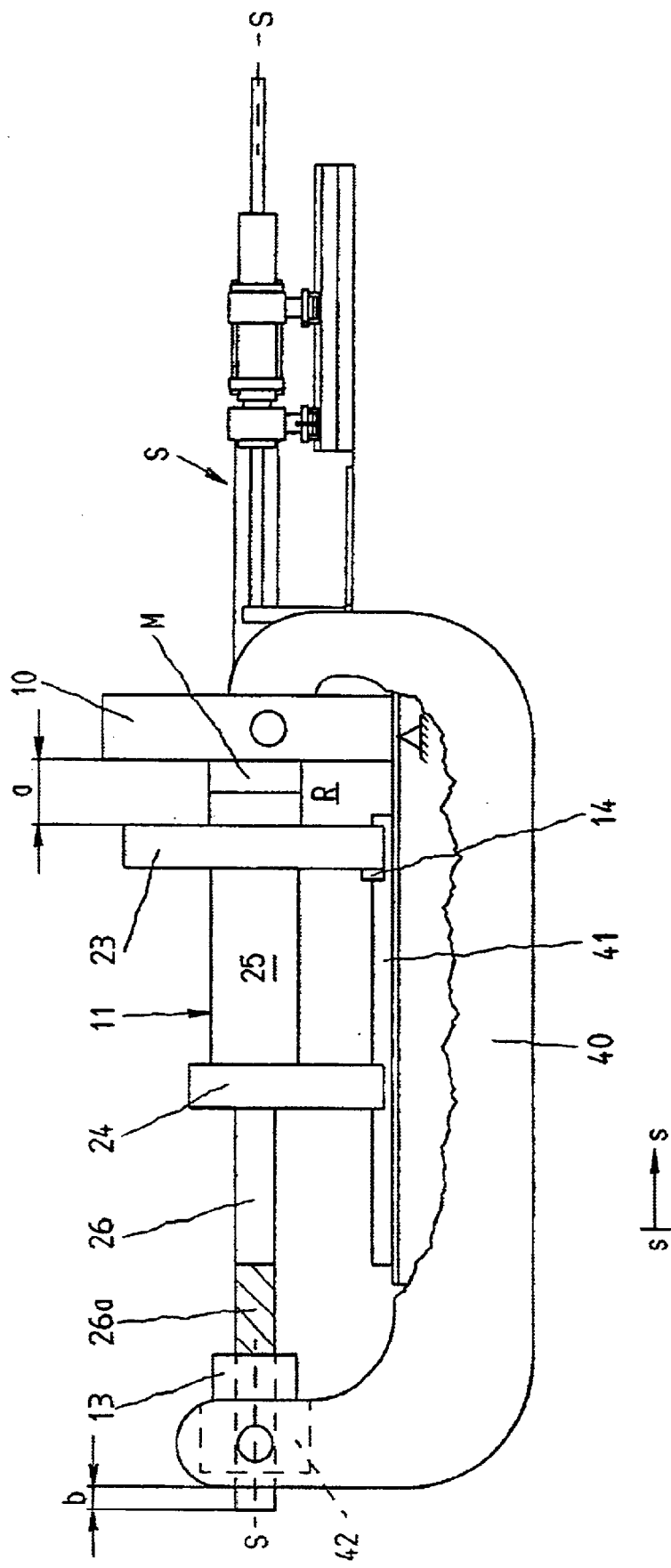
Figure 9:
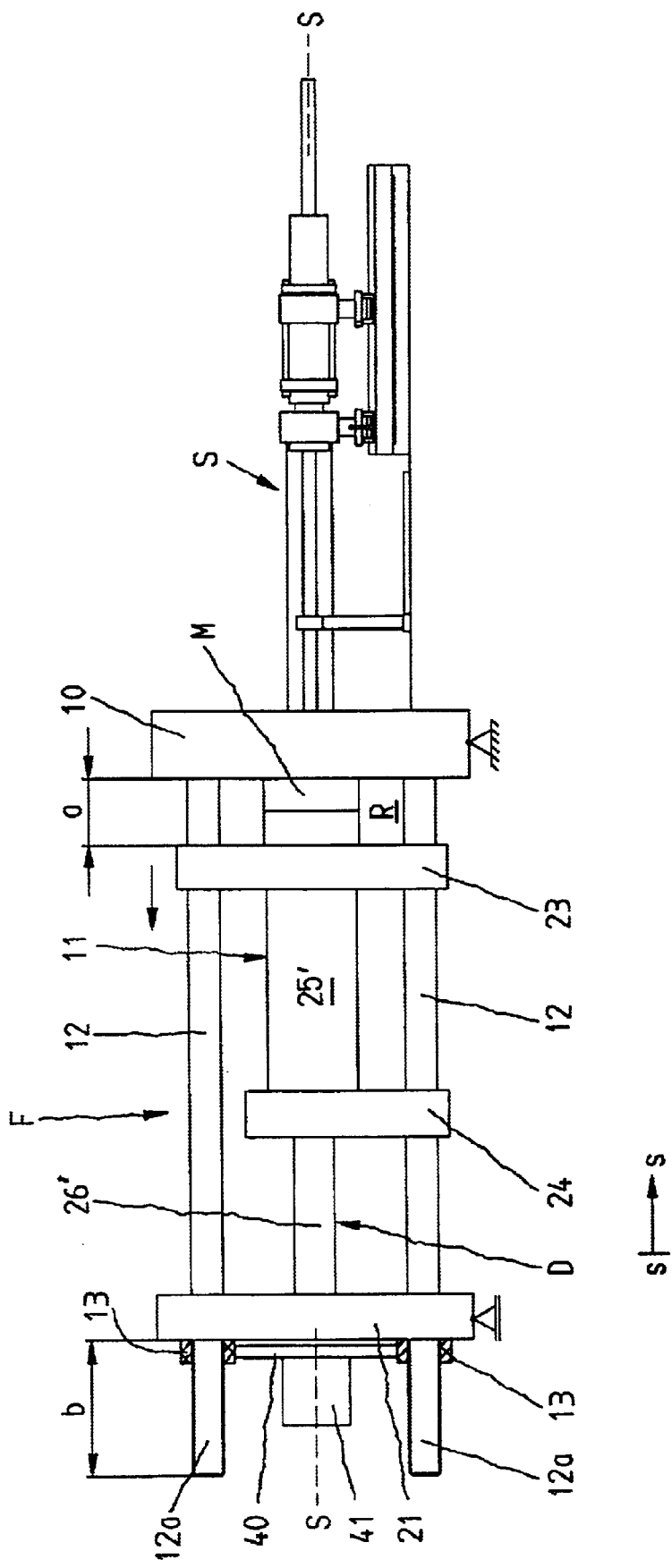

The invention is explained in greater detail below with the aid of the enclosed figures. They show:

FIG. 1 a schematic representation of an injection molding machine in side view, in operation FIG. 2 the injection molding machine according to FIG. 1 with clamped moveable mold carrier, FIG. 3 a representation as per FIG. 1 in operation with adjusted support element, FIGS. 4,5 the collet chuck of the clamping device for fixing the spacing a in the open and closed position, FIGS. 6,7 the fixing device on the moveable mold carrier in open and clamped position, FIG. 8 an embodiment of an injection molding machine without any bars, FIG. 9 a further embodiment of an electromechanically driven injection molding machine.

ILLUSTRATION OF PREFERRED EMBODIMENTS

FIG. 1 shows schematically an injection molding machine for processing plastics materials and other plasticizable masses, which has an injection molding unit S and a mold-closing unit F. The mold-closing unit has a stationary mold carrier 10, whose position e.g. in relation to the machine base is fixed and in the present case is indicated by a fixed bearing. Furthermore, a moveable mold carrier is provided which in the present case is a constructional unit consisting of the clamping plate 23, the cylinder 25 with piston rod 26 of drive D and a backing plate 24. Mold clamping plate and backing plate are braced with one another, such that a precise unit guided on guide elements 12 is produced which forms the moveable mold carrier 11 and has a pre-determined fixed length. The mold clamping plate 23 of the moveable mold carrier 11 and the stationary mold carrier 10 enclose between themselves the mold tentering space R. In this mold tentering space, injection molds M of variable height can be used, as in particular FIG. 1 and FIG. 2 make clear. According to the height of the injection mold M, the spacing a between the moveable mold carrier 11 and the stationary mold carrier 10 is greater or smaller. The height of the mold which determines this spacing a is measured in the closing direction s—s.

To move the moveable mold carrier, a drive D is provided which moves the moveable mold carrier in the closing direction s—s toward the stationary mold carrier 10 and away from it again. A part of this drive D is in this embodiment, besides the cylinders 25, the piston rod 26. In the present case, the piston rod 26 is supported on the support element 21. It is also conceivable to dispose the closing mechanism on the stationary mold carrier and thus obtain a two-plate system, the device for fixing the spacing a being then allocated as clamping device 13 to the stationary mold carrier 10. Furthermore, the drive D, which is hydraulic here, can also be e.g. electromechanical or pneumatic.

What is common to all the drives mentioned is that they have at least two parts which are operationally connected to one another, of which one part is supported on the support element 21 and the other part is connected to the moveable mold carrier 11. One of the two parts of drive D extends as a linear movement means for the moveable mold carrier 11 in a linear fashion in the closing direction. To this end, it can either move in a linear fashion together with the moveable mold carrier 11 or be arranged on the support element. What this means will be clear from the following examples.

If drive D is a hydraulic drive or a pneumatic drive, the parts of the drive D, cylinder 25 and piston rod 26 form a piston-cylinder unit. In this case cylinder and piston rod are both linear movement means which dip in a linear fashion in and out of one another during the movement of the drive. Thus in the figures, cylinder 26 moves with the moveable mold carrier 11 and to this extent forms a unit of fixed length into which the piston rod plunges as the other part of the drive. A non-linear movement of parts of the drive as in a toggle joint does not take place.

In an electromechanical drive 41 according to FIG. 9, such as e.g. a ball screw or telescopic activators in which a spindle head is moved in a threaded bush, as e.g. in DE 195 42 453 A, the parts of drive D comprise a rotational element and a linear movement means which is operationally connected thereto and which is fixed in the axial direction, namely in the closing direction s—s, to the support element 21 or the moveable mold carrier 11 and thus also forms a unit of fixed length. Even with an electromechanical embodiment, above all in an embodiment according to DE 195 42 453 A, a picture can arise similar to FIGS. 1 to 3, as FIG. 9 illustrates. An electromechanical drive 41 rotates a rotational element inside the tube 26', which is operationally connected to a linear movement means inside the part 25'. However, from the outside it looks essentially like a hydraulic drive.

Since these units can be adjusted in any way in respect of the opening stroke, as a result of their purely linear movement, providing mold-closing units of this type with a mold height adjustment system was previously refrained from. However precisely this has clear advantages. Thus in a hydraulic closing unit, simultaneously with the opening stroke, the oil pad on which at each cycle the closing pressure bears down, is optimized and thus generally reduced, so that not only energetic optimization of the opening stroke is achieved, but since a smaller volume has to be pressurized, simultaneously the time for applying the pressure is reduced with otherwise identical boundary conditions. If the same occurs in an electromechanical unit, the components or at least the lengths of the components are reduced, which are subjected to the locking forces and thus to the corresponding expansions.

Guide elements 12 configured as tie bars reach through the stationary mold carrier 10 and the moveable mold carrier 11 in FIGS. 1 to 3. They serve as a guide for the moveable mold carrier 11 during its movement and can, as will be gone into later, also serve as a guide for the support element 21 during its movement. For this purpose, only one portion 12a of the guide element 12 is necessary, so that with other guiding of the moveable mold carder 1 the rest of the guide element can be dispensed with (FIG. 8). The support element 21 is in this embodiment mounted moveable in relation to the machine base in the closing direction s—s, and this is indicated by the symbol for the corresponding moveable bearing arrangement. The guide elements 12 have at least one portion 12a with which the clamping device 13 between the stationary mold carrier 10 and moveable mold carrier 11 comes into operational connection, as soon as the desired spacing a is set.

In addition, a fixing device 14 is allocated to the moveable mold carrier 11 which, on actuation, fixes the moveable mold carrier 11 in its respective position. This fixing can be on the guide elements 12, as in the embodiment, however fixing the moveable mold carrier to the machine base or to another suitable stationary location is also conceivable. As soon as the movable mold carrier has been fixed, the drive D, which is generally a component of the closing device for moving the moveable mold carrier 11 and for applying the locking pressure, can be actuated when the fixing device 14 is actuated and the clamping device 13 is out of operational connection, in order to move the support element 21 along its guide, here along portions 12a of the guide elements 12, and thus to alter the spacing a for the following injection cycles. This is shown by FIGS. 1 to 3.

In FIG. 1 the clamping device 13 is fixed on the guide elements 12. Simultaneously the fixing device 14 is open as the spacing between the clamping jaws and the guide elements 12 in FIG. 1 makes clear. In this state, the moveable mold carrier can be moved along the guide elements by drive D, which produces an optimization in respect of the spacing a of the small mold M shown in FIG. 1.

In FIG. 2 a larger injection mold M is transferred into the mold tentering space R. Here the support element 21 is still in the position of FIG. 1. It becomes clear that in this state no satisfactory opening movement can be brought about for the injection mold M. Therefore, as indicated by the arrows, the fixing device 14 is locked, by which means the moveable mold carrier is held secure in its position. Then the clamping device 13, which is allocated to each guide element 12, is unlocked. If drive D is now actuated, there is no movement of the moveable mold carrier because it is clamped. Instead, the support element 21 is now moved in the closing direction s—s, such that a position of the support element as per FIG. 3 is produced, which position is adapted to the corresponding mold height. In order to make an injection molding process possible again, the support element 21 is locked with the clamping element 13 and the fixing device 14 is unlocked. Now the further process of manufacturing injection molded parts can take place, adapted to the altered mold height.

To be precise, the spacing a between the stationary mold carrier 10 and the moveable mold carrier 11, just like the opening stroke of the mold-closing unit, is adjusted by drive D, which in a small injection mold with a small mold height, has to cover a larger movement path than in an injection mold with a large mold height. However if an unaltered movement path of the moveable mold carrier 11 is assumed, an alteration of spacing a takes place, as a comparison between FIGS. 1 and 3 shows. However the spacing between support element 21 and stationary mold carrier 10 has also changed as has the distance b of the guide elements 12 projecting beyond the support element. To this extent, one could also talk about an adjusting device to adjust the length b of the projecting guide elements 12, optimizing the amount of oil with an unaltered movement path of drive D.

Naturally, the fixing device 14 has to be arranged only on any part of the moveable mold carrier, and it can comprise a single or a plurality of fixing devices. In the embodiment they are arranged on the backing plate 24, however they can also be arranged directly on the mold clamping plate 23. It must just be ensured that the movement of the moveable mold carrier can be temporarily prevented by the fixing device.

Portion 12a of the guide element 12 has an altered cross-section, it being intended that this cross-section alteration should contribute to making possible a positive operational connection with the clamping device 13 to fix the spacing a. A positive connection free from play is desired at this location, since high forces have to be applied during the injection cycle, to which the clamping device 13 must be equal. The cross-sectional alteration can be grooves or, in this embodiment, a thread 12b. A thread has the advantage that it can be manufactured very precisely as a result of continuous manufacturing in thread cutting. Instead of the collet chuck, however, a conventional nut 13', which is driven via a gear drive 40 as in FIG. 9 to displace the support element, can also engage in such a thread. What is common to both embodiments however is that not only the mold height but also the opening stroke or the closing path can be adjusted.

The fixing device 14 on the other hand is fixed in a non-positive manner, since this device is open during the injection cycle and only low forces are applied during the secondary function of the adjustment of the mold height in this respect the non-positive connection is adequate for this purpose.

Thus where higher forces have to be applied constantly, i.e. in the standard operational state, a positive connection is provided which can be detached as required to adjust the mold height. In the other region, in which the moveable mold carrier only has to fixed for a short time, in order to effect the adjustment of the mold height, the moveable mold carrier can, on the other hand, be fixed on the guide elements or on the machine base merely by a non-positive connection.

In both cases, but above all in the positive operational connection, collet chucks are used to this end. The collet chucks have the advantage, that as a result of the secure clamping, clamping free from play between the guide elements and in particular the support element is guaranteed, since unlike the known threaded adjustments, no thread play has to be taken into account. By this means, the precision of the whole injection molding machine can be simultaneously increased de spite the existing mold height adjustment. For safety, the devices are so constructed that the basic function of injection molding is always adjusted automatically under the effect of resilient means.

FIGS. 4 and 5 show preferred embodiments of the clamping device 13 to fix spacing a free from play. As clamping device 13, an actuating element 15 for a first collet chuck 38 is provided which element is disposed coaxially to the guide elements 12 in the region of portion 12a. The collet chuck has a threaded bush 16 which enters positive operational connection with the thread 12b of portion 12a when the collet chuck is actuated. The clamping device 13 is so constructed that it automatically remains in the locked position under the force of a resilient means 22 held on pins 37. Unlocking to adjust the mold height or to adjust spacing a takes place under the effect of a hydraulic medium. This hydraulic medium is led via the hydraulic connection 29 into the annular hydraulic chamber 27. As a comparison between FIG. 4 and FIG. 5 shows, the application of this hydraulic medium leads to an axial movement of the annular piston 17 against the force of the resilient means 22. During this movement, the conical portion 17a of the annular piston 17 moves out of engagement and the conical region 16a of the collet chuck 38 moves into engagement. Consequently, the threaded bush 16 is expanded by the cone ring 31 and a relative movement between support element 21 and guide element 12 is rendered possible. If the hydraulic pressure in the hydraulic chamber 27 is reduced, as a result of the resilient means 22 mounted in recess 21a of the support element 21, resetting of the annular piston 17 into a position as per FIG. 5 comes about. In this movement, the cone ring 31 connected via fastening means 32 to the annular piston 17 is also moved axially with said piston. On the other hand, the movement of the (double) annular piston 17 is ended by the conical region 16b and the conical portion 17a coming together. The hydraulic chamber 27 is also limited in an axial direction by a closing element 33.

FIGS. 6 and 7 show the fixing device 14. This fixing device 14 has a second collet chuck 19, which is disposed in the embodiment coaxially to a guide element 12 and is fixed on the moveable mold carrier 11, or more precisely on the backing plate 24 in a recess 24a. The fixing device has a housing 36 which encloses a hydraulic chamber 28 radially towards the outside, to which chamber hydraulic medium can be applied via a hydraulic connection 30. The second collet chuck 19 has a conical region 19a which causes the clamping with a conical portion 18a of the hydraulically actuated annular piston 18. The return into the non-clamped position takes place under the effect of an additional resilient means 20. As a comparison between FIGS. 6 and 7 shows, the movement of the annular piston is limited on the one hand by a stop on the housing 36 and on the other hand by the conical portion 18a and conical region 19a coming into contact with one another. The elastic means 20 is mounted in a closing element 34 which is connected to the housing 36 via securing means 35.

FIG. 8 shows a further embodiment in which the piston rod 26 of drive D serves as the guide element, and comes into positive operational connection with the clamping device 13 via a portion 26a which in this respect can be equated with the previously-mentioned portion 12a. FIG. 8 also shows that use of clamping device 13 and fixing device 14 is also possible on a machine without bars, in which instead of tie bars, a force transmission element 40 guides the forces occurring during injection molding around the mold tentering space R to achieve better accessibility. This force transmission element, possibly also multipart, is hinged on one hand to the stationary mold carrier 10. On the other hand, drive D is supported on its opposite end 42 associated with the moveable mold carrier 11. Here the clamping device 13 can be provided which cooperates with portion 26a. If the clamping device 13 is open and the fixing device 14 engaging on the guide element 41 is locked, the drive D can displace portion 26a of the piston rod 26 relative to the clamping device. Thus altered movement paths of the moveable mold carrier are produced for subsequent injection cycles.

It is obvious that this description can be subject to a wide variety of modifications, changes and adjustments, which fall into the area of equivalents to the pending claims.

What is claimed is:

1. Mold-closing unit for an injection molding machine for processing plastics materials and other plasticizable masses, comprising:
   a stationary mold carrier;
   a support element;
   a moveable mold carrier disposed between the support element and the stationary mold carrier;
   a mold tentering space disposed between the stationary mold carrier and the movable mold carrier to accommodate injection molds of variable height, measured in a closing direction;
   a drive adapted to move the movable mold carrier and the support element; guide elements that guide the movable mold carrier and the support element during movement of the movable mold carrier and the support element; and
   means for moving the support element independently from the movable mold carrier.

2. Mold-closing unit according to claim 1, wherein the means for moving the support element includes a first device and a second device, which are in operable communication with the movable mold carrier.

3. Mold-closing unit according to claim 1, wherein the drive is a hydraulic drive, the drive includes a cylinder and a piston rod of a hydraulic piston-cylinder unit.

4. Mold-closing unit according to claim 1, wherein the drive is an electromechanical drive and includes a rotational element and a linear movement means in operational connection with the rotational element.

5. Mold-closing unit according to claim 2, wherein the means for moving the support element includes actuating means for actuation of the first device and actuation of the second device in an alternating manner.

6. Mold-closing unit according to claim 5, wherein the first device is a clamping device and the second device is a fixing device, the second device is in operable communication with a portion of the guide elements.

7. Mold-closing unit according to claim 6, wherein the clamping device has a first collet chuck, which is disposed coaxially to the guide element in a region of the portion of the guide elements and can be transferred with the portion of the guide elements into positive operational connection free from play.

8. Mold-closing unit according to claim 7, wherein the first collet chuck has a conical region that is in hydraulic operational connection with a cone ring connected to an annular piston and under the force of resilient means, the annular piston being axially moveable to a limited extent along the guide element.

9. Mold-closing unit according to claim 6, wherein the portion the guide of elements has a thread to form a positive operational connection with a threaded bush of the clamping device.

10. Mold-closing unit according to claim 6, wherein the clamping device, to form a positive operational connection with the portion of the guide elements has at least one nut which is operationally connected to a thread of said portion.

11. Mold-closing unit according to claim 2, wherein the second device fixes the moveable mold carrier in a non-positive manner to the guide elements.

12. Mold-closing unit according to claim 11, wherein the second device has a second collet chuck which is disposed coaxially to one of the guide elements and is fixed on the moveable mold carrier.

13. Mold-closing unit according to claim 12, wherein the second collet chuck has a conical region and wherein a second hydraulically actuated annular piston with a conical portion effects the clamping with the conical region when hydraulic pressure is applied.

14. Mold-closing unit according to claim 13, the second annular piston being able to be reset via an additional resilient element.

15. Mold-closing unit according to claim 2, wherein the first device variably fixes the mold tentering space, the first device enters operational connection with a portion of the guide elements to fix the mold tentering space,
   the second device is a fixing device allocated to the moveable mold carrier which, on actuation, fixes the moveable mold carrier in its respective position,
   wherein when the second device is actuated and the first device is out of operational connection, the drive alters the mold tentering space by displacing the first devices along the guide elements, wherein a part of the drive extends as a linear movement means for the moveable mold carrier in a linear manner in a closing direction even during the closing movement.

16. Mold-closing unit according to claim 1, wherein the drive serves as adjusting means for adjusting its own opening stroke.

17. Mold-closing unit for an injection molding machine for processing plastics materials and other plasticizable masses, comprising:
- a stationary mold carrier;
- a support element;
- a moveable mold carrier disposed between the support element and the stationary mold carrier;
- a mold tentering space disposed between the stationary mold carrier and the moveable mold carrier to accommodate injection molds or variable height;
- a drive adapted to move the moveable mold carrier and the support element;
- means for guiding the moveable mold carrier and the support element during a movement of the movable mold carrier and the support element; and
- means for moving the support element independently from the moveable mold carrier.

18. Mold-closing unit according to claim 17, wherein the means for guiding includes guide elements that guide the moveable mold carrier and the support element during movement of the moveable mold carrier and the support element.

19. Mold-closing unit according to claim 17, wherein the means for moving the support element includes first device and second device, which are in operable communication with the movable mold carrier.

20. Mold-closing unit according to claim 19, wherein the first device is a clamping device and the second device is a fixing device, the second device is in operable communication with the means for guiding.

* * * * *